C. Davenport & A. Bridges. Sheet 1. 4 Sheets.

Car Truck.

No. 183. Reissued Dec. 3, 1850.

C. Davenport & H. Bridges. Sheet 2, 4 Sheets.

Car Truck.

No. 183. Reissued Dec. 3, 1850.

C. Davenport & A. Bridges. Sheets 3. 4 Sheets.

Car Truck.

No. 183. Reissued Dec. 3, 1850.

C. Davenport & A. Bridges. Sheet 4, 4 Sheets.

Car Truck.

No. 183. Reissued Dec. 3, 1850.

UNITED STATES PATENT OFFICE.

CHARLES DAVENPORT AND ALBERT BRIDGES, OF CAMBRIDGEPORT, MASS.

RAILROAD-CARRIAGES.

Specification forming part of Letters Patent No. 2,071, dated May 4, 1841; Reissue No. 183, dated December 3, 1850.

*To all whom it may concern:*

Be it known that we, CHARLES DAVENPORT and ALBERT BRIDGES, both of Cambridgeport, in the county of Middlesex and State of Massachusetts, have invented a new and useful Improvement in Railroad-Carriages, by which the inconvenience to passengers and liability of injury to the cars arising from the sudden lateral motion of the wheels on the rails is obviated; and we do hereby declare that the following is a full and exact description of the same, reference being had to the accompanying drawings, which, taken in connection herewith, form our specification, setting forth the principles of construction of our improvement (by which it may be distinguished from others of a like character) and such parts or combinations as we claim to be our invention, and for which we desire an exclusive privilege for fourteen years to be secured to us by Letters Patent.

Most persons who travel by railroad experience a continual repetition of sudden jars or shocks, arising from the sidewise movement of the flanges of the wheels of the car against the rails of the track, and so extensive are the evils of these frequent shocks, that besides being greatly to the discomfort of the passengers, preventing them almost entirely from reading while traveling in this manner, it is highly injurious to the carriages and axles, causing the joints and other parts to become loose and soon deranged.

Figures 1, 2:
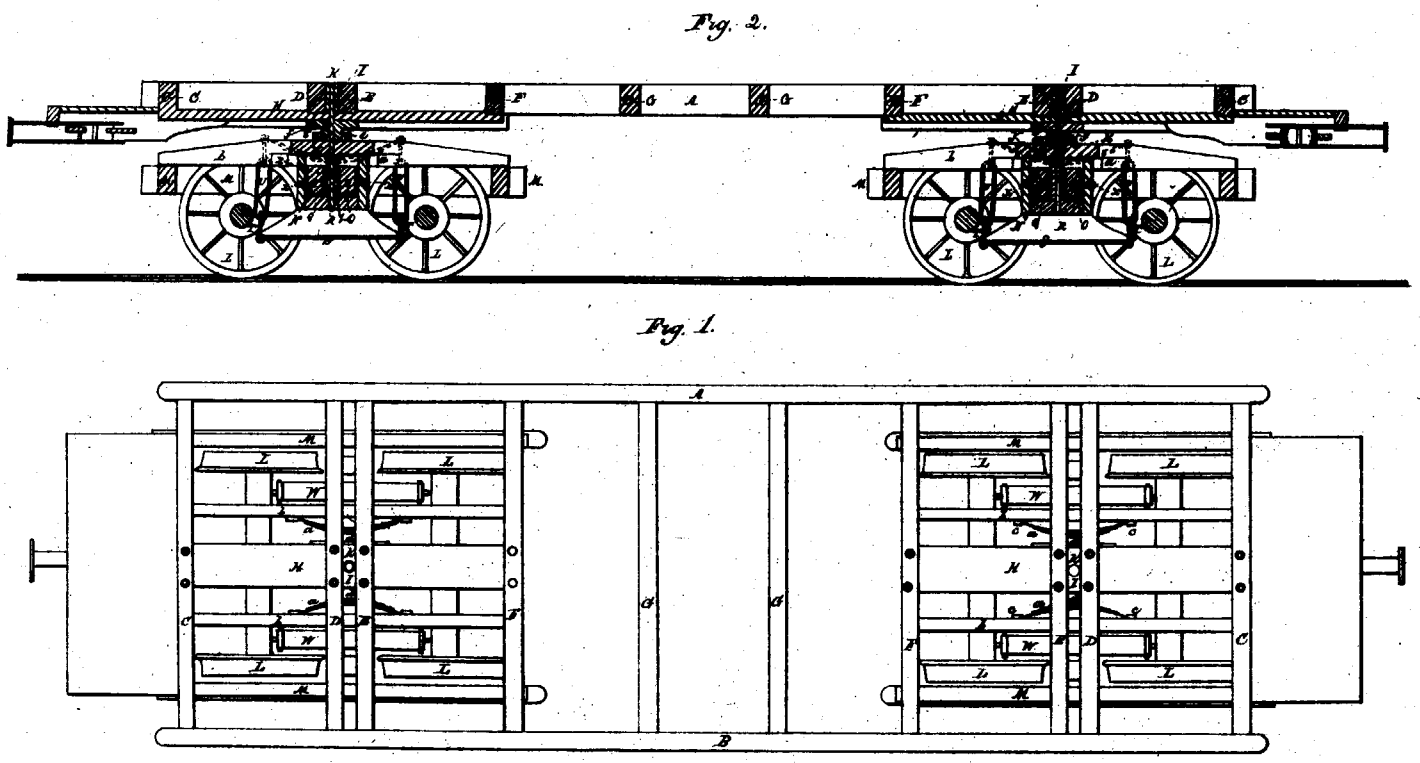
Figure 4:
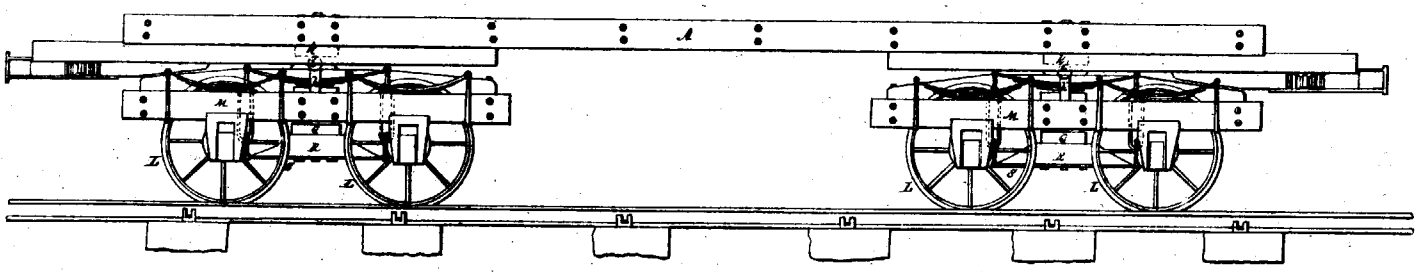
Figure 3:
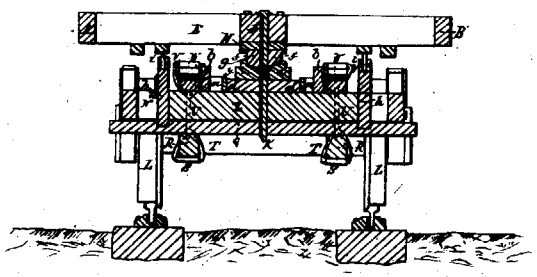
Figure 5:
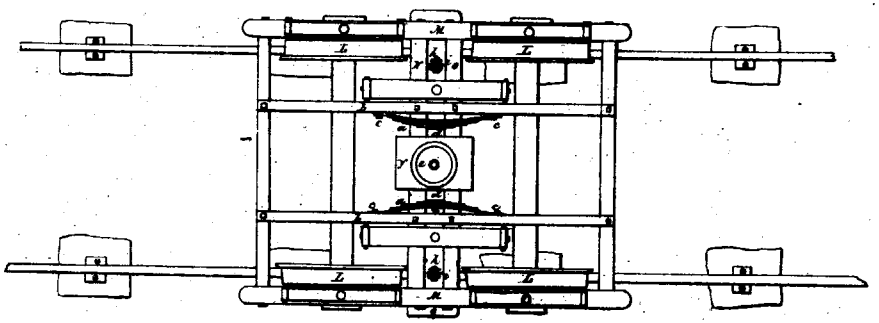

The object of our improvement is to obviate the effects of the above lateral shocks by mechanism suitably arranged, and which we now proceed to explain:

Figure 1 of the drawings herewith presented represents a top view of the frame and wheels of an eight-wheel carriage, (or "long car," as it is usually termed in order to distinguish it from the common short or four-wheel car,) the body being removed therefrom. Fig. 2 is a vertical longitudinal section of the above. Fig. 3 is a transverse vertical section taken centrally between either of the two axles of each set of four wheels. Fig. 4 is a side elevation of the frame and running machinery on which the carriage rests. Fig. 5 is a top view of the latter detached from the frame above the same.

The supporting-frame, upon which the body is placed consists of two side beams, A B, (see the different drawings,) united at suitable distances by transverse ties C D E F G G F E D C, whose ends are mortised into or otherwise properly secured to the beams.

It will be perceived by inspection of Figs. 1 and 2 that the second and third ties from each end, viz., D E, are placed at a small distance apart in comparison with the others. Under the beams C D E F is a central and longitudinal plank, H, extending from the first tie, C, to the fourth, F, and well secured thereto and to the central ties, D E, by bolts or otherwise.

As our improvement is connected with both systems of truck-wheels or both trucks, it will be sufficient to explain its application to either.

The ties D E are connected together in the center by a block, I, inserted between them, and resting on the top of the plank H, and through this block the long bolt K is passed, which connects the wheels to the carriage. The wheels L L L L are connected to the truck-frame M in the usual manner. The said truck-frame is rectangular, being suitably constructed for the purpose for which it is intended. The outer or side beams of the frame have two transverse beams, N O, extending between them, and situated at a suitable distance apart to permit the standards of a cross-beam or wide plank, Q, to play vertically between the same. The plank Q extends under the frame M and between the wheels, as represented in the drawings, and has two cross-bars, R R, Figs. 2, 3, applied at right angles to its under side. Metallic springs or plates S S are bolted to the under side of the bars R R, to the ends of which springs common shackles or loops T T are applied, from which shackles suspension-links U U or other similar contrivances extend upward, as seen in Figs. 2 and 3, and connect with the loops V V of common semi-elliptic springs W W, suitably applied to the top of the transverse beams N O, as seen in Figs. 1, 4. Two iron standards or planks, X X, Fig. 2, of sufficient width, are bolted to the opposite sides of the plank Q, and extend upward perpendicularly therefrom somewhat above the tops of the beams N O, as seen in the drawings, and are connected together at their tops by a strong iron plate or longitudinal plank, Y. A deep plank or standard, Z, also rests or is bolted upon the upper edge of the plank Q, its position being seen in Figs. 2, 3. The width of this plank Z is about the the same as the distance between the beams N O, it being so arranged as to move vertically between the same. The cross-plate Y also rests directly upon the plank Z, as seen in Figs. 2, 3, 5. Two semi-elliptic springs, *a a*, Figs. 3, 5, may be suitably arranged on the inner sides of longitudinal beams *b b*, Figs. 2, 3, 5, their ends passing under staples *c c*, inserted in the sides of the beams *b b*, or being otherwise properly connected thereto, so as to support the springs and permit them to operate as required. The upright guiding-plank Z has a shoulder, *d*, Figs. 3, 5, formed thereon on each side of the plate Y, each of which shoulders abuts or rests against the center of one of the springs *a*. The top of the center plate, Y, has a suitable circular step, *e*, or bearing cast thereon, which receives a circular pivot, *f*, projecting from a plate, *g*, applied to the under side of the plank H, the bolt K passing downward through the pivot and its step, as seen in the drawings. Two standards, *h h*, Figs. 3, 4, 5, are arranged on the plank Q, between the beams N O, outside of the springs W W, as seen in the drawings. Small vertical friction-wheels *i i* are placed in the tops of these standards, and small rail-pieces *k k* to rest on said friction-wheels, are bolted to the lower sides of the two beams D E.

From the above it will be seen that the carriage rests upon the plate Y and the friction-wheels, or, in other words, by means of the intervening parts, on the springs W W, so that its perpendicular movements are relieved by the said springs. The connection of these springs with the lower springs or plates, S S, on the cross-bars R R, by means of the suspension-links U U, admits a pendulous or lateral motion of the plank Q, and consequently the carriage is thus permitted to move sidewise. When this takes place, one of the shoulders *d d* is pressed against the adjacent spring *a*. Therefore, whenever there is lateral motion of the wheels, so that their flanges strike suddenly against the side of the rail, any unpleasant effect of the same on the carriage and passengers is rendered imperceptible by the relief afforded by the springs *a a*, or any mechanical equivalent for relieving the shock and bringing the turning bearing back to its central position. The running machinery is permitted to adapt itself to curves of the railway by means of the circular step *e* and pivot *f*, and the carriages of the train are connected together in the usual manner by the common spring and buffing apparatus, which is represented in the drawings as applied to each end of the carriage-frame.

Figure 6:
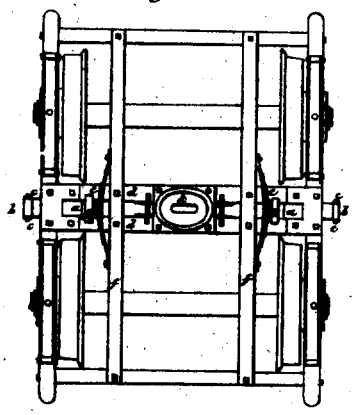
Figure 7:
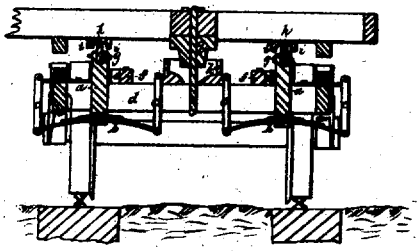
Figure 8:
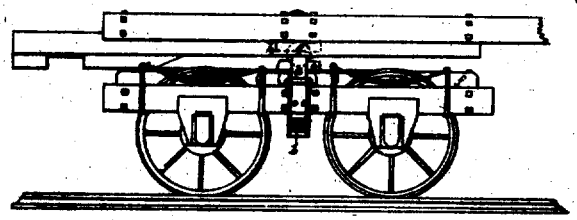
Figure 9:
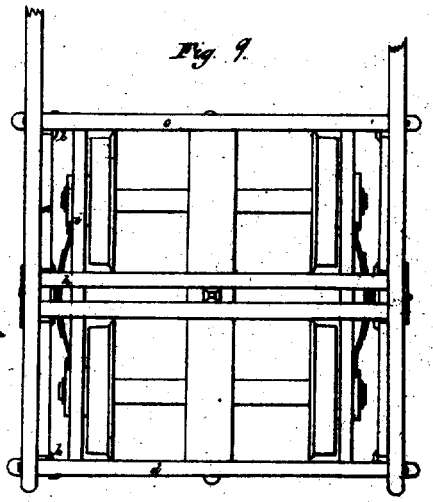
Figure 10:
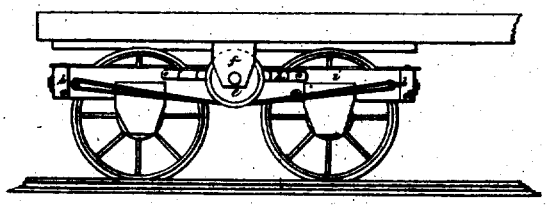
Figure 11:
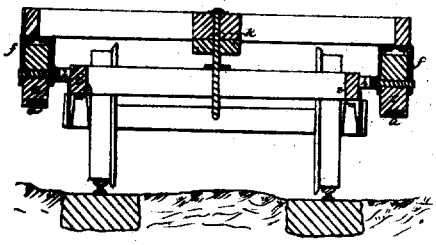

Figs. 6, 7, and 8 exhibit another disposition of the springs and other parts for relieving the shocks resulting from the lateral motion. Fig. 6 is a top view of the running machinery. Fig. 7 is a transverse section, and Fig. 8 is a side view of the same, with the carriage-frame resting thereon. By this arrangement it will be perceived that the standards *a a*, Figs. 6, 7, and 8, upon which the carriage-frame rests and in the tops of which are the small friction-wheels *g g*, as before described, are supported and secured upon the central part of the semi-elliptic springs *b b*, arranged transversely and between the wheels or under the cross-beams *d d*, and supported at their ends by the suspending-link *c c*, hung from proper hinged bearings applied to the top of the cross-beams *d d*. Springs *e e*, when used to relieve the side shocks, may be placed on the outer side of each of the parallel and longitudinal beams *f f*, so that their central parts shall rest against the inner side of the standards *a a*, and their ends bear against and be properly affixed to the outer sides of the beams *f f*. In this case each of the friction-wheels *g g* in the top of the standards *a a* should play in a grooved block or plate, *h*, Fig. 7, applied to the under side of the carriage-frame, the sides *i i* of the groove serving as shoulders to keep the respective parts of the machinery in place while the carriage is running. This particular arrangement of the supporting-springs *b b* requires that the step *k*, in which the pivot *l* of the carriage rests, as before described, and which in this instance is bolted to the top of the cross-beams *d d*, should be elongated transversely, as seen in Figs. 7, 9, instead of circular, so as to allow of the play or lateral movement of the running machinery under the carriage-body. Figs. 9, 10, and 11 exhibit another modification of our invention, the former figure representing a top view of the carriage-frame and parts under the same.

Fig. 10 is a side elevation, and Fig. 11 a transverse section, of the above. The frame of the carriage is here supported on strong leather thorough-braces, *a a*, Figs. 10, 11, placed on each side of the frame, and whose ends are supported by staples *b b*, properly secured to the ends of the cross-beams *c d*, Fig. 10. The carriage rests on these thorough-braces by means of the strong friction wheels or rollers *e e*, Figs. 10, 11, moving in bearings *f f*, applied to the under sides of the outer beams, *g g*, of the carriage-frame. Elliptic or other proper springs *h h*, Figs. 9, 10, 11, for aiding in relieving the side shocks, may be placed directly behind each of the friction or bearing rollers, or between them and the sides *i i* of the frame to which the wheels are attached. The springs are curved outward, as seen in Fig. 9, having their centers resting against the bearing of the friction-wheels and their extremities suitably attached to and resting against the sides *i i* of the wheel-frame. Now, as the thorough-braces permit the truck-frames or running machinery to move sidewise independent of the carriage or carriage-frame, such springs, *h h*, will aid in counteracting the force by which the flanges of the wheels impinge upon the rails, and prevent any inconvenience to the passengers therefrom. When the wheels run over a curve in the railway, they will easily adapt themselves to the same, for as the frame to which they are attached turns on the center bolt or pin, K, the rollers or wheels *e e* will move a short distance over the upper surface of the thorough-braces, and when the wheels pass from a curve to a straight line they will return to their former position.

Figure 12:
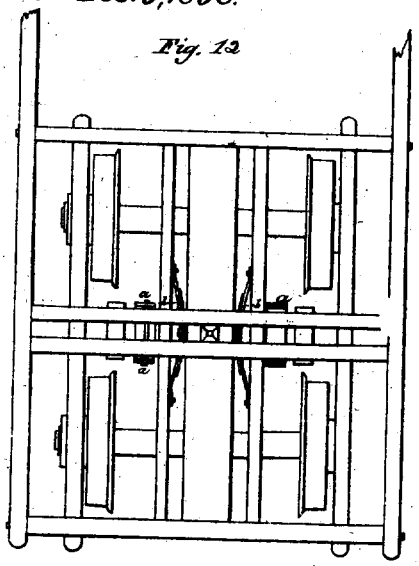
Figure 13:
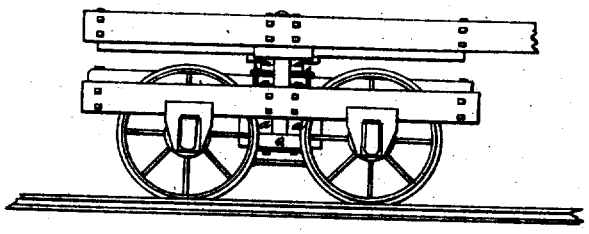
Figure 14:
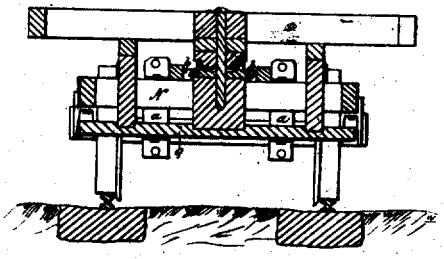

In freight and many other cars the method above described of sustaining the carriage-frame by suspending-links connected with springs may be often dispensed with, and the suspending-links may be employed without springs, as will be seen by reference to Figs. 12, 13, 14, the former being a top view of the carriage-frame and running machinery under the same, while Fig. 13 is a side elevation, and Fig. 14 a tranverse section, of the above. In this case the construction would be every way substantially similar to that exhibited in Figs. 1, 2, 3, 4, 5, and herein first described, with the exception that the springs W W, Figs. 2, 3, would be omitted, and the springs *b b* used or not, as circumstances might require, the plank Q being supported in position by suspending-bars *a a*, Figs. 13, 14, 12, applied to opposite sides of the central beams, one of which beams, viz., N, is shown in Fig. 14. The suspending-bars are suitably hung at their tops by proper supports applied upon the upper surfaces of the center beams, which supports are to be of such character as to permit these bars to swing or have a pendulous motion transversely—that is to say, in a direction perpendicular to the railway. They are also connected to the plank Q by a similar arrangement, so that the plank Q and the cross-beams will always be parallel with respect to each other during the vibratory movements of the former. The springs for aiding in counteracting the side shocks are represented at *b b*, Fig. 12.

Previous to our invention the "long car," as it is termed—that is to say, one composed of a car-body and two or more four-wheel truck-frames (such a car having been, as we believe, invented in this country)—had its turning-bearing of its car-body made stationary upon the truck-frame, the latter being capable of horizontal rotation independently of the carriage body or frame, but without any lateral play or movement of its turning bearing or contrivances which support the car-body on the truck-frame. After such a car had been in use, it was discovered by us that in order to obviate the injurious or unpleasant effect of shocks, as above mentioned, it was necessary to combine with the truck-frame (and not only with one truck-frame but with the other at the same time, in order to more completely produce the desired effect) some mechanical contrivance or contrivances which would not only allow the turning-bearing or turning and supporting contrivance a lateral play movement or movements, independent of the truck-frame, wheels, and axles, but bring or remove it back to its central position after, or immediately after, the lateral deflective force had ceased to act. We were the first, as we believe, to apply such mechanism as hereinbefore described. The weight of the carriage-body or it and its load, by its or their gravitating power, would operate to depress the suspension-links to a vertical position after any lateral throw of the turning-bearing and carriage-body had taken place. Such weight would also operate to overcome or counterbalance the lateral deflection of the supporting-bearing as well as to gradually relieve the car-body and bearing from the injurious or unpleasant effects produced by the shock of the wheels against the rails. In connection with the pendulous links or their mechanical equivalents lateral springs we found might often be used to advantage to aid in removing the effects of the shock and restoring the turning-bearing back to a central position.

We are aware that common carriages for common turnpikes or common roads have had their bodies connected to their springs by very short links or contrivances, which were used for the purpose of permitting the expansion and contraction of the springs, and which would allow the body to have a very slight lateral motion independent of the wheels and axles. In such cases, however, the construction of such carriages and the arrangement of the suspension and turning contrivances, wheels, and axles differed essentially from the railway long car on which our improvement has been made. We therefore by no means intend to claim the broad principle of suspending and giving a carriage-body a lateral movement independent of the carriage-frame which connects it with the wheels as or in any of the modes in which the same has been accomplished previous to our invention, but we confine ourselves to our method of accomplishing the same and of overcoming the difficulties hereinbefore mentioned, as well as others, as incident to railway-cars of the kind known as the "long car." We would also remark that but one of the truck-frames of such a car may have our invention applied to it, but when it is applied to two of them at opposite ends of the car, there is a combined action of the two which tends to straighten the line of draft in a train of cars when running on a curve of the railway. They also conjointly operate to overcome or prevent other injurious effects not hereinabove mentioned.

We do not claim as our invention the making stationary the turning bearing or contrivance which support the railway "long car" or carriage-body on the truck-frame, and allows a horizontal rotary motion of the truck-frame independently of the car-body or frame, as this has been done before the date of our invention; but in order to obviate the effect of lateral shocks, as specified, as well as for sundry other purposes, What we do claim is—

The connecting the said turning-bearing to the truck-frame of the above-described kind, resting on four wheels or more, by a mchanism, substantially such as described, that shall not only allow such turning-bearing, independently of the wheels and axles, a lateral play, movement, or movements, in directions transversely of the carriage, but bring or move it back to its central position after the lateral deflective force has ceased to act.

In testimony whereof we have hereto set our signatures.

CHARLES DAVENPORT.
ALBERT BRIDGES.

Witnesses:
R. H. EDDY,
F. GOULD.